United States Patent
Carter, Jr.

(10) Patent No.: US 6,524,068 B2
(45) Date of Patent: Feb. 25, 2003

(54) VARIABLE PITCH AIRCRAFT PROPELLER CONTROL WITH TWO-SPEED TRANSMISSION

(75) Inventor: Jay W. Carter, Jr., Burkburnett, TX (US)

(73) Assignee: Cartercopters, L.L.C., Wichita Falls, TX (US)

( * ) Notice: Subject to any disclaimer, the term of this patent is extended or adjusted under 35 U.S.C. 154(b) by 0 days.

(21) Appl. No.: 09/863,636

(22) Filed: May 23, 2001

(65) Prior Publication Data
US 2002/0031430 A1 Mar. 14, 2002

Related U.S. Application Data

(60) Provisional application No. 60/206,672, filed on May 24, 2000.

(51) Int. Cl.[7] .............................................. B64C 27/00
(52) U.S. Cl. .................... 416/1; 415/124.1; 416/170 R
(58) Field of Search ......................... 415/122.1, 124.1, 415/1; 416/1, 170 R; 244/60, 17.19

(56) References Cited

U.S. PATENT DOCUMENTS

| | | | | |
|---|---|---|---|---|
| 2,319,781 A | * | 5/1943 | Pullin ........................... 416/47 |
| 2,665,859 A | | 1/1954 | Papadakos ...................... 244/7 |
| 2,771,143 A | * | 11/1956 | Campbell ................... 416/123 |
| 2,809,701 A | * | 10/1957 | Campbell ..................... 416/26 |
| 2,974,902 A | * | 3/1961 | Schofer .................... 244/17.19 |
| 4,632,337 A | | 12/1986 | Moore ..................... 244/17.19 |
| 4,660,437 A | * | 4/1987 | Scott ........................... 74/675 |
| 4,783,023 A | * | 11/1988 | Jupe .............................. 244/6 |
| 5,011,464 A | * | 4/1991 | White ........................ 475/260 |
| 5,782,433 A | | 7/1998 | Goi et al. ...................... 244/60 |
| 5,853,145 A | | 12/1998 | Carter, Jr. ................. 244/17.25 |
| 5,865,399 A | | 2/1999 | Carter, Jr. ..................... 244/54 |
| 5,944,283 A | | 8/1999 | Carter, Jr. .................... 244/104 |
| 5,997,250 A | | 12/1999 | Carter, Jr. et al. ............. 416/27 |
| 6,077,041 A | | 1/2000 | Carter, Jr. .................... 416/169 |
| 6,024,325 A | | 2/2000 | Carter, Jr. ................. 244/17.25 |
| 6,155,784 A | | 12/2000 | Carter, Jr. .................... 416/134 |

FOREIGN PATENT DOCUMENTS

GB                 309350            4/1929

* cited by examiner

Primary Examiner—Ninh Nguyen
(74) Attorney, Agent, or Firm—Bracewell & Patterson, L.L.P.

(57) ABSTRACT

A variable pitch aircraft propeller control uses a two-speed planetary gearbox between a turbine engine and an adjustable pitch propeller. For maximum efficiency, the rotation rate of the propeller is high at aircraft take-off to generate maximum static thrust. However, when at high altitude and at high speed, the propeller rotation rate is reduced to hold the vector sum of the aircraft forward speed and the propeller rotational tip speed at the speed that results in the highest efficiency for the propeller. The two-speed transmission supplies these two gear ratios. At takeoff and low altitude flight, a low gear ratio is used. At high altitude, a high gear ratio is used. The gear ratio maybe manually selected by the pilot, or automatically changed by the propeller controller to obtain the best combined efficiency for the engine and the propeller.

19 Claims, 2 Drawing Sheets

VARIABLE PITCH AIRCRAFT PROPELLER CONTROL WITH TWO-SPEED TRANSMISSION

This application claims priority from provisional application Ser. No. 60/206,672, filed May 24, 2000.

BACKGROUND OF THE INVENTION

1. Technical Field

The present invention relates in general to an improved variable pitch propeller controller comprising a two-speed transmission between the engine and the propeller. Ideally, the controller enables the engine to run at maximum horsepower when the rotational speed (rpm) of the propeller is reduced to hold the vector sum of the aircraft forward speed, and the propeller rotational tip speed at the speed that results in the highest propeller efficiency.

2. Description of the Prior Art

U.S. Pat. No. 5,997,250 describes a propeller pitch control apparatus for an aircraft in which the desired propeller rotational speed is based on the vector sum of the aircraft forward speed and the propeller rotational tip speed, the horsepower output, and the speed of sound in the current conditions, to maximize efficiency and minimize noise. According to that invention, at high forward speeds of the aircraft, the rotation rate of the propeller should be decreased to keep the vector sum propeller tip speed at a percentage of the speed of sound based on horsepower, because this increases propeller efficiency.

Non-turbocharged reciprocating aircraft engines and turbine engines develop reduced power level at altitude because the reduced density of the air at altitude provides less oxygen. At high altitudes, such aircraft engines often must be run at maximum RPM in order to develop even this reduced power. With a fixed gear ratio between the engine and the propeller, it is not possible to maintain maximum engine power while also reducing the propeller rotation rate for best propeller efficiency at high forward speeds.

Accordingly, it is an object of the present invention to provide a simple, lightweight means whereby both the engine efficiency and the propeller efficiency can be maximized both for takeoff and for high altitude, high speed cruising.

SUMMARY OF THE INVENTION

One embodiment of a variable pitch aircraft propeller control uses a two-speed planetary gearbox between a turbine engine and an adjustable pitch propeller. For maximum efficiency, the rotation rate of the propeller is high at aircraft take-off to generate maximum static thrust. However, when at high altitude and at high speed, the propeller rotation rate is reduced to hold the vector sum of the aircraft forward speed and the propeller rotational tip speed at the speed that results in the highest efficiency for the propeller. The two-speed transmission supplies these two gear ratios. At takeoff and low altitude flight, a low gear ratio is used. At high altitude, a high gear ratio is used. The gear ratio may be manually selected by the pilot, or automatically changed by the propeller controller to obtain the best combined efficiency for the engine and the propeller.

The foregoing and other objects and advantages of the present invention will be apparent to those skilled in the art, in view of the following detailed description of the preferred embodiment of the present invention, taken in conjunction with the appended claims and the accompanying drawings.

BRIEF DESCRIPTION OF THE DRAWINGS

So that the manner in which the features, advantages and objects of the invention, as well as others which will become apparent, are attained and can be understood in more detail, more particular description of the invention briefly summarized above may be had by reference to the embodiment thereof which is illustrated in the appended drawings, which drawings form a part of this specification. It is to be noted, however, that the drawings illustrate only a preferred embodiment of the invention and is therefore not to be considered limiting of its scope as the invention may admit to other equally effective embodiments.

DETAILED DESCRIPTION OF THE PREFERRED EMBODIMENT OF THE PRESENT INVENTION

Figure 1:
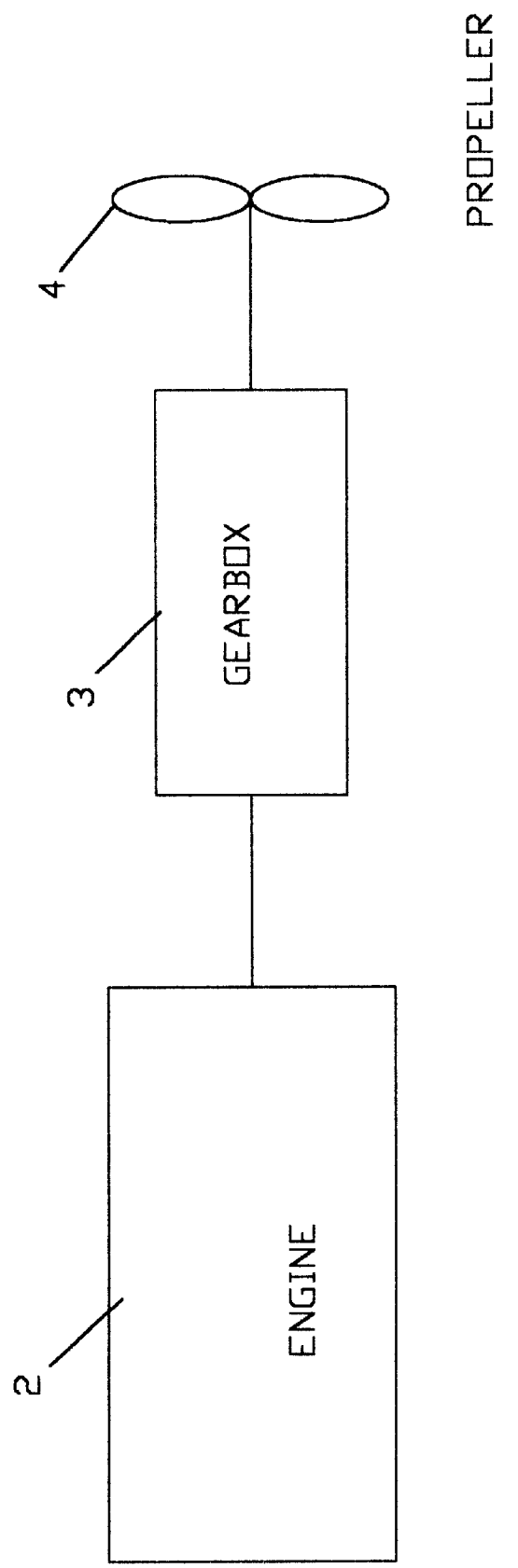
FIG. 1 shows a turbine engine connected through a two-speed planetary gearbox to an adjustable pitch propeller.

This invention is an improvement of U.S. Pat. No. 5,997,250, all of which material is hereby incorporated by reference. Referring to FIG. 1, a turbine engine 2 is connected through a two-speed planetary gearbox 3 to an adjustable pitch propeller 4. A planetary gearbox was chosen because it is easy to change gear ratios without having to reduce the throttle, but other types of transmissions also could be used. The adjustable pitch propeller 4 is a pusher propeller that is mounted to the rear of an aircraft (not shown).

Figure 2:
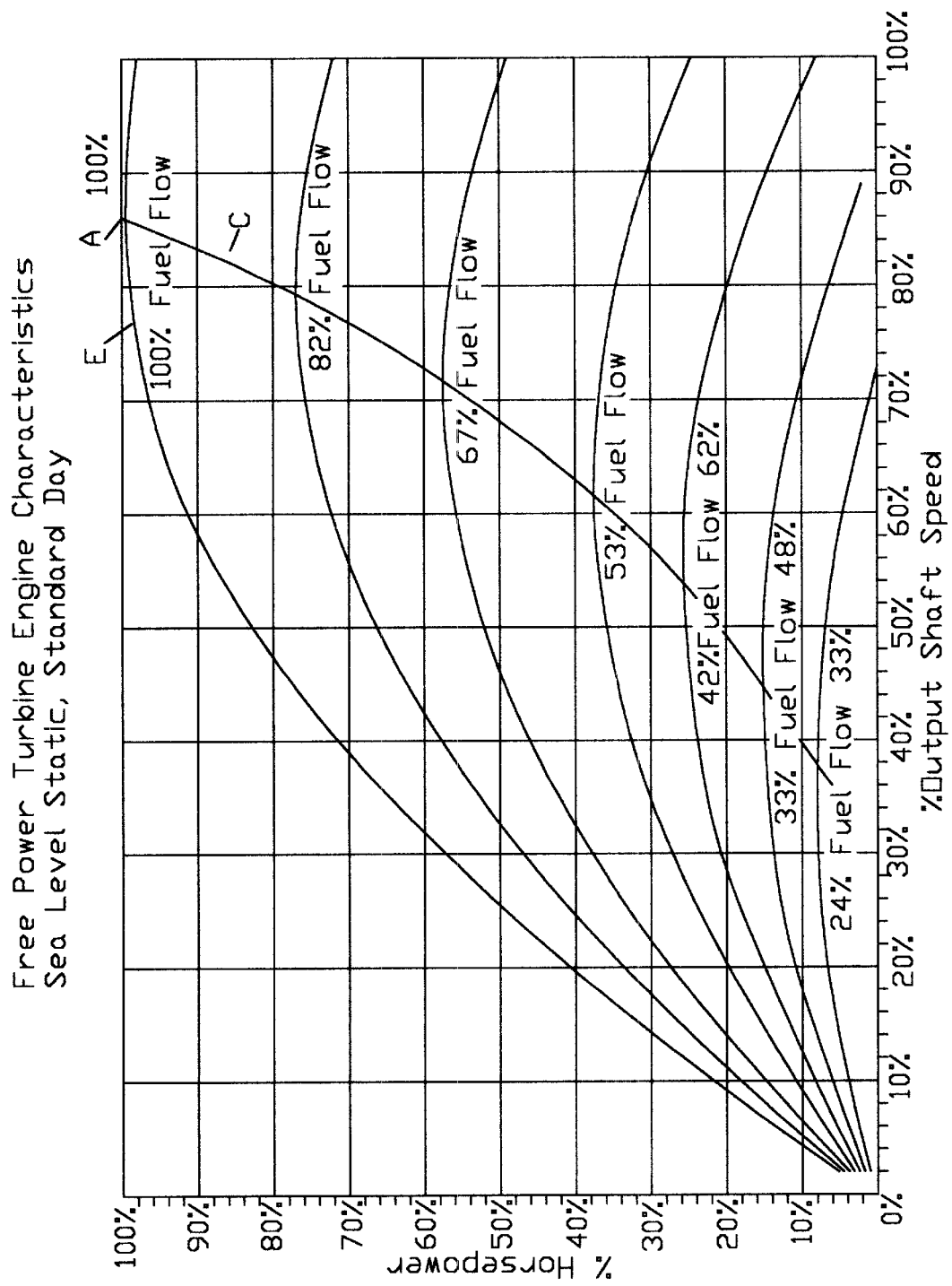
FIG. 2 shows a graph of horsepower output as a function of shaft speed and fuel flow for a turbine engine.

FIG. 2 shows a graph of horsepower output as a function of shaft speed and fuel flow at sea level. Referring first only to the 100% fuel flow curve, we see that the highest efficiency occurs at point A, at 86% shaft speed, because here the engine is generating the most horsepower for the given fuel flow. At high altitude, there is much less oxygen in the air than at sea level, so the maximum fuel flow will be much less than 100%, but the shaft speed for maximum horsepower and best efficiency will still be about the same as at sea level.

The propeller 4 rotation rate for maximum efficiency is based on different constraints than the engine. At takeoff, the propeller 4 rotation rate should be high to generate maximum static thrust. However, when at high altitude and at high speed, the propeller 4 rotation rate needs to be reduced to hold the vector sum of the aircraft forward speed and the propeller 4 rotational tip speed at the speed that results in the highest efficiency for propeller 4.

For example, for a prototype rotor wing aircraft, the takeoff propeller RPM is approximately 2250, while the high-speed, high-altitude propeller RPM is 1350 RPM at 400 miles per hour. The shaft speed for best engine efficiency is about the same at takeoff as at high altitude and high speed, yet the propeller rotation rate for best propeller efficiency in these two conditions is markedly different.

Two-speed transmission 3 can supply these two gear ratios. At takeoff and relatively low altitude flight, the low gear ratio is used. At relatively high altitude, high speed or cruising flight, the high gear ratio is used. The gear ratio could be manually selectable by the pilot, or automatically changed by the propeller 4 controller to obtain the best combined efficiency for the engine and propeller 4. Since a turbine engine core runs at an extremely high rotation rate, a gearbox is necessary anyway to reduce the rotation rate for connection to a propeller 4. A planetary gearbox is very efficient from a weight and volume standpoint, so adding a second speed that shifts automatically without reducing throttle is relatively insignificant with respect to the weight and the complexity of the design.

Referring again to FIG. 2, note that shaft speeds up to 15% above and below point A can be used with only about a 4% loss of horsepower and efficiency. Therefore, one way to select the drive ratios is to perform takeoff at approximately 100% shaft speed (point D) so that, as the aircraft accelerates and the propeller 4 RPM for maximum propeller efficiency decreases, the engine moves along the 100% fuel flow curve through point A to point E. At point E, the transmission shifts into low gear, so the propeller 4 RPM remains the same while the shaft speed accelerates to point D again. As the aircraft climbs and accelerates, the propeller RPM continues to decrease and the shaft speed decreases to point A again. It is best to have high speed cruise occur at point A, not past point A toward point E, since cruise is the longest portion of the flight.

Referring now to the entire fuel flow curve in FIG. 2, the highest point in each fuel flow curve is the point where the turbine is running most efficiently. Curve C is drawn through the highest points in each fuel flow curve and is the curve of maximum efficiency. It is desirable to operate the engine on or near this maximum efficiency curve, especially at reduced throttle settings which are normally used to increase efficiency and extend range. Fortunately, the propeller 4 also is more efficient when operated at lower speeds at lower power settings, so following the engine maximum efficiency curve also provides high propeller efficiency.

Reciprocating engines can also benefit from connection through a two-speed gearbox 3 to an adjustable pitch propeller 4. At high altitudes, a non-turbocharged reciprocating engine is similar to a turbine engine in that the engine must operate at a high RPM to generate sufficient power because of the lack of oxygen. Yet the propeller 4 should be turning slowly because of the high forward speed. While many small, older aircraft engines are connected directly to the propeller 4 without a reduction drive, most large aircraft engines and most new designs for small engines incorporate a reduction drive, so the addition of a two-speed drive is not a great burden.

The present invention has several advantages. The planetary gearbox allows the gear ratios to be easily changed without having to reduce the throttle. The planetary gearbox is very efficient from a weight and volume standpoint, so adding a second speed that shifts automatically without reducing throttle is relatively insignificant with respect to the weight and the complexity of the design. In addition, the gear ratio may be manually or automatically changed to obtain the best combined efficiency for the engine and propeller.

While the invention has been shown or described in only some of its forms, it should be apparent to those skilled in the art that it is not so limited, but is susceptible to various changes without departing from the scope of the invention.

What is claimed is:

1. An aircraft propulsion apparatus for use during flight of the aircraft, comprising;
   an engine;
   a gearbox connected to the engine, the gear box having a low gear ratio and a high gear ratio;
   an adjustable pitch propeller connected to the gearbox for providing forward thrust to the aircraft; and wherein at takeoff and low altitude flight, the low gear ratio is used, and at high altitude, high speed flight, the high gear ratio is used in order to obtain the best combined efficiency for the engine and propeller under both operating conditions.

2. The propulsion apparatus of claim 1 wherein the gearbox is a two-speed planetary gearbox.

3. The propulsion apparatus of claim 1 wherein the gear ratio is manually selectable.

4. The propulsion apparatus of claim 1 wherein the gear ratio is automatically changed by a propeller controller.

5. The propulsion apparatus of claim 1 wherein the gear ratio is changed without reducing a throttle setting of the aircraft.

6. The propulsion apparatus of claim 1 wherein the engine is a turbine engine.

7. The propulsion apparatus of claim 1 wherein the engine is a non-turbocharged reciprocating engine.

8. An aircraft propulsion apparatus for use during flight of the aircraft, comprising:
   an engine;
   a two-speed planetary gearbox connected to the engine, the gear box having a low gear ratio and a high gear ratio;
   an adjustable pitch propeller connected to the gearbox for providing forward thrust to the aircraft; wherein at takeoff and low altitude flight, the low gear ratio is used, and at high altitude, high speed flight, the high gear ratio is used in order to obtain the best combined efficiency for the engine and the propeller under both operating conditions; and wherein
   the gear ratio is changed without reducing the throttle setting of the aircraft.

9. The propulsion apparatus of claim 8 wherein the gear ratio is manually selectable.

10. The propulsion apparatus of claim 8 wherein the gear ratio is automatically changed by a propeller controller.

11. The propulsion apparatus of claim 8 wherein the engine is a turbine engine.

12. The propulsion apparatus of claim 8 wherein the engine is a non-turbocharged reciprocating engine.

13. A method of enhancing a combined efficiency for an aircraft engine and an adjustable pitch propeller for providing forward thrust to an aircraft under various flying conditions, comprising:
   (a) providing a gearbox between the engine and the propeller, wherein the gear box has a low gear ratio and a high gear ratio;
   (b) operating the gearbox with the low gear ratio at takeoff and low altitude flight; and
   (c) operating the gearbox with the high gear ratio at high altitude, high speed flight.

14. The method of claim 13 wherein step (a) comprises providing a two-speed planetary gearbox.

15. The method of claim 13, further comprising the step of manually selecting steps (b) and (c).

16. The method of claim 13, further comprising the step of automatically selecting steps (b) and (c).

17. The method of claim 13, further comprising the step of changing the gear ratio without reducing a throttle setting of the aircraft.

18. The method of claim 13 wherein step (a) comprises providing a turbine engine.

19. The method of claim 13 wherein step (a) comprises providing a non-turbocharged reciprocating engine.

* * * * *